United States Patent [19]
Heberlein

[11] 3,747,956
[45] July 24, 1973

[54] SPHERICAL VEHICLE

[76] Inventor: Harold V. Heberlein, Box 269, Reverton, Wyo. 82501

[22] Filed: Nov. 22, 1971

[21] Appl. No.: 201,056

[52] U.S. Cl. ............................................. 280/206
[51] Int. Cl. ........................................... A63g 29/00
[58] Field of Search .................... 280/207, 78, 206, 280/290, 150 SB; 115/20; 272/1 R, 1 B, 57 R, 33 R

[56] References Cited
UNITED STATES PATENTS

| 3,083,037 | 3/1963 | Gordon et al. | 272/1 R |
| 3,499,681 | 3/1970 | Benitez Jr. et al. | 280/150 SB |
| 2,953,394 | 4/1960 | Anderson | 280/207 |
| 3,532,340 | 11/1970 | Nardiello | 272/57 R |
| 3,013,806 | 12/1961 | Boyd | 280/207 |

Primary Examiner—Kenneth H. Betts
Assistant Examiner—J. M. McCormack
Attorney—Edward S. Irons et al.

[57] ABSTRACT

A vehicle of a generally spherical configuration is disclosed for receiving therein and conveying a person. Within the spherical vehicle, there is disposed a handrail suspended by a plurality of springs from the shpere and a support jacket for supporting the person within the vehicle. The supported person may propel the spherical vehicle by fore and aft, and vertical and horizontal body movements upon the rail.

10 Claims, 8 Drawing Figures

3,747,956

SPHERICAL VEHICLE

BACKGROUND OF THE INVENTION

1. Field of the Invention

This invention relates to vehicles capable of motivation by a person disposed therein and more particularly to such vehicles of a substantially spherical configuration.

2. Description of the Prior Art

The prior art has provided vehicles of a generally spherical configuration which are adapted to some of the uses to which applicant's invention is directed. More specifically, spherical vehicles have been adapted to receive people who by their physical movement within the vehicle are able to cause the circle apparatus to move in a prescribed direction. Typically, such a vehicle would be caused to rotate by the person inside who is able to cause the rotation by peddling upon the inner periphery thereof in a treadmill fashion. Such a device would typically include a bar therein forming an axis about which this spherical vehicle is rotated.

Other devices, in form of a wheel, have been adapted to support a man and to permit the man to rotate himself within the wheel to thereby propel himself and the wheel in a direction perpendicular to the axis of wheel rotation.

Such apparatus as referred to above, have a recreational value. The person's enjoyment as well as his exercise may be enhanced by movements required to motivate the vehicle. Such vehicles typically require only a limited type of movement to propel the vehicle in a prescribed, limited direction. Further, as such vehicles begin to rotate, it is necessary to securely support the operator within that apparatus to insure his safety.

SUMMARY OF THE INVENTION

It is therefore an object of this invention to provide a new and improved spherical vehicle capable of movement by its operator, in a rotational as well as in "jumping" motion. It is a still further object of this invention to securely position the operator within the spherical vehicle to permit the operator to motivate the vehicle by a variety of body movements.

These and other objects are accomplished in accordance with the teachings of this invention by providing a vehicle of a substantially spherical configuration having a generally circular handrail disposed therein and suspended from the spherical vehicle by spring means. Support means are provided to securely suspend an operator within the vehicle and to permit him by various body movements to impart motion to the spherical vehicle through the handrail.

In an illustrative embodiment of this invention, the spherical vehicle may be made up of a plurality of segments which may be easily transported and then assembled into the unitary, spherical vehicle. In a further aspect of this invention, the support means may take the form of a vest suspended within the spherical vehicle by a plurality of straps attached thereto. Further, a suitable step assembly may be secured to the handrail whereby the operator may secure his foot to the handrail even in an upside down position.

BRIEF DESCRIPTION OF THE DRAWINGS

In the detailed description of the preferred embodiment of the invention presented below, reference is made to the accompanying drawings in which.

DETAILED DESCRIPTION OF THE PREFERRED EMBODIMENT

Figure 1:
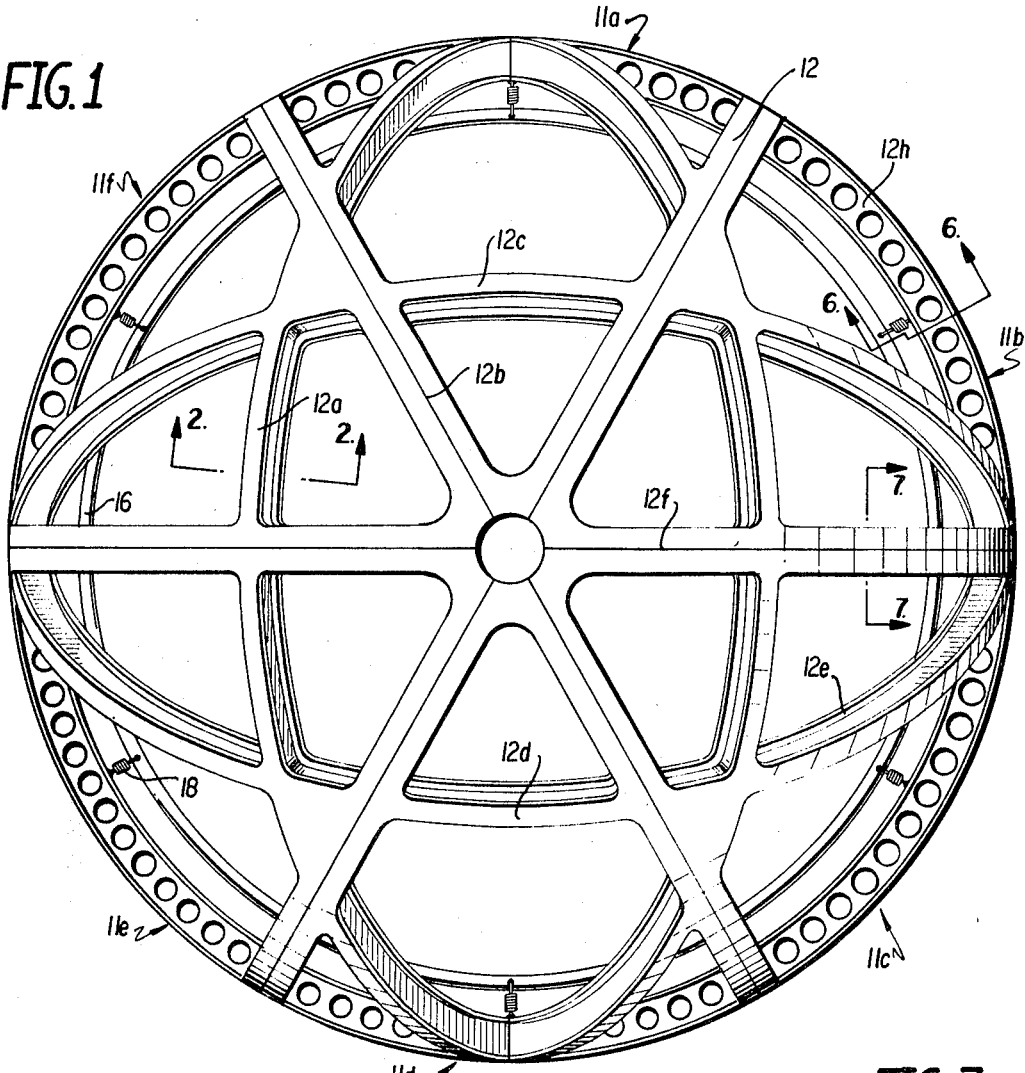
FIG. 1 is a plan view of a spherical vehicle in accordance with the teachings of this invention.
Figure 2:
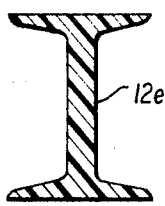
FIG. 2 is a cross-sectioned view of a strut member forming the spherical vehicle as shown in FIG. 1, taken along line II—II of FIG. 1.

With regard to FIG. 1, there is shown a spherical vehicle 10 in accordance with the teachings of this invention. The vehicle 10 has a generally spherical configuration and is formed by plurality of spherical segments 11a, 11b, 11c, 11d, 11e, and 11f, which are joined together at their outer edges to form the spherical vehicle. Further, the spherical vehicle 10 is formed of a plurality of struts 12 of generally circular configurations which extend about the vehicle 10 and are disposed at appropriate angles with respect to each other. The spherical vehicle 10 may be made of a relatively inexpensive, durable plastic which may be molded to form the strut members 12 in a general configuration of I beams. The strut members 12 can be molded together to form each of the individual segments 11. By so constructing this spherical vehicle 10 of a plurality of segments 11, the vehicle may be easily disassembled and transported to the location of use where the segments 11 may be easily re-assembled. The use of struts 12 of I beam configuration permit the formation as by molding together of a structure which is not only light weight but also structurally strong. Both of these considerations are significant to insure the portability of the spherical vehicle 10 as well as to insure that the person suspended therein will be protected in a safe manner.

Figure 7:
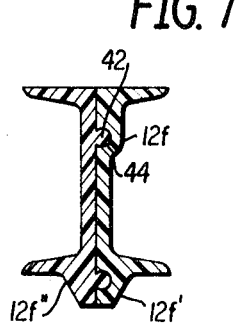
FIG. 7 is a cross-sectioned view of how the sphere segments of the spherical vehicle of FIG. 1 are assembled as taken along line VII—VII of FIG. 1.

With regard to FIG. 7, there is shown that a cross-sectioned view of the strut member 12f is of a generally I beam configuration and is made up of two portions 12f' and 12f'' which are parts of the segments 11b and 11c respectively, as shown in FIG. 1. In order to secure the portions 12f' and 12f'' and thereby the segments 11b and 11c, a plurality of male projections 42 are provided on portion 12f' for being disposed within and held by a plurality of receiving openings 44 within the portion 12f''. Thus, the portions 12f' and 12f'' may be easily snapped together to rigidly hold the segments 11b and 11c together. In a similar manner, each of the segments 11 may be likewise assembled rapidly to form the spherical vehicle 10. The resultant structure is not only strong but also easily assembled.

Figure 6:
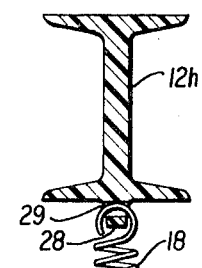
FIG. 6 is a cross-sectioned view showing the connection of the handrail to a strut member taken along line VI—VI of FIG. 1.
Figure 5:
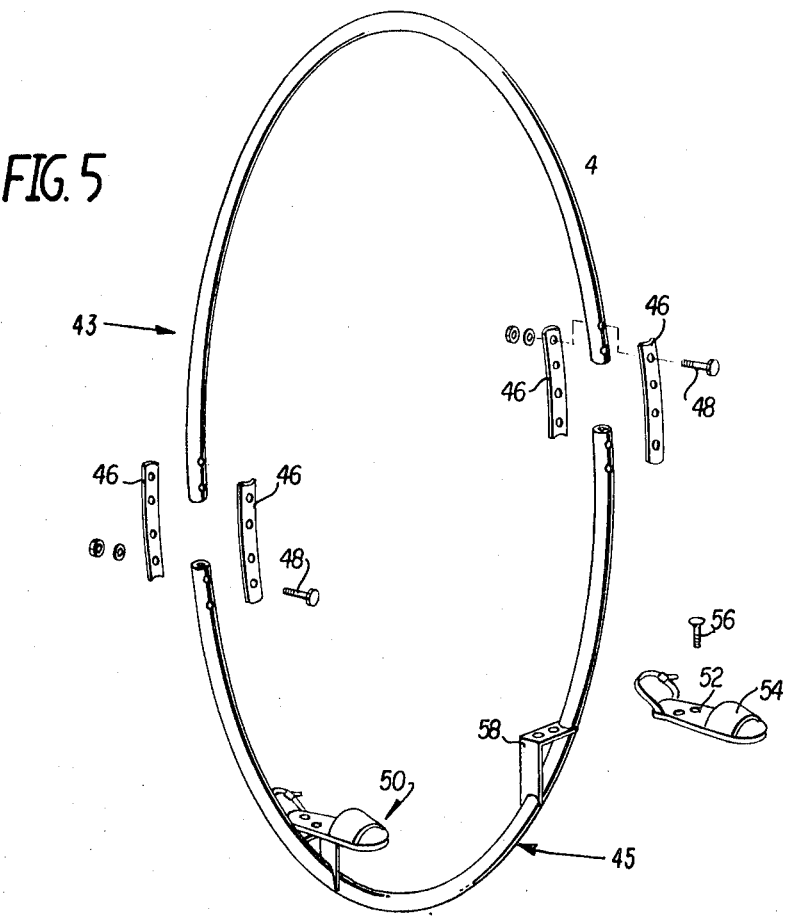
FIG. 5 is an assembly diagram of the handrail to be disposed within the spherical vehicle, as shown in FIGS. 1 and 3.

After the spherical vehicle 10 has been so assembled, a handrail 16 may be suspended therein by spring means taking the form of a plurality of springs 18 disposed about the inner circumference of the vehicle 10. As indicated in FIG. 1, the springs 18 are connected at one end to the strut member 12h, and at their other end to the handrail 16, which may be made of a lightweight metal pipe. As shown in FIG. 5, the handrail 16 may be formed by first and second segments 43 and 45 which may be joined together at their respective ends by a pair of connecting brackets 46 As may be seen from FIG. 1, the handrail 16 is disposed within the spherical body 10 and spaced apart therefrom. As indicated in fig. 5, a plurality of fasteners 48, such as a nut and bolt, may be disposed through openings within the brackets 46 and the ends of the segments 43 and 45 to thereby secure the segments 43 and 45 together. In an illustrative embodiment of this invention, 12 similar springs 18 may be interconnected between the spherical vehicle 10 and handrail 16. With reference to FIG. 6, there is shown one of the plurality of springs 18 which serves as resilient biasing means between the spherical vehicle 10 and the handrail 16. More specifically, one end of the spring 18 is inserted through an opening 15 of the handrail 16, while the other end is secured to one of the strut members, and in particular to strut member 12h. The strut member 12h has a support rib 28 with an opening 29 therein for receiving the other end of the spring 18. In a similar manner, each of the springs 18 are interconnected between the strut member 12h and the handrail 16. As shown in FIG. 5, means are provided for receiving and releasably securing the foot of the operator to the handrail 16. In particular, a step assembly 15 includes a flexible upper member 54, made of a suitable material such as rubber, and is attached to a sole member 52 in a suitable manner, to receive the foot or shoe of the operator. The sole member 52 is secured to a bracket 58 by suitable fasteners 56 such as nuts and bolts. In turn, the bracket 58 is fixedly secured to the handrail 16 as by welding.

Figure 3:
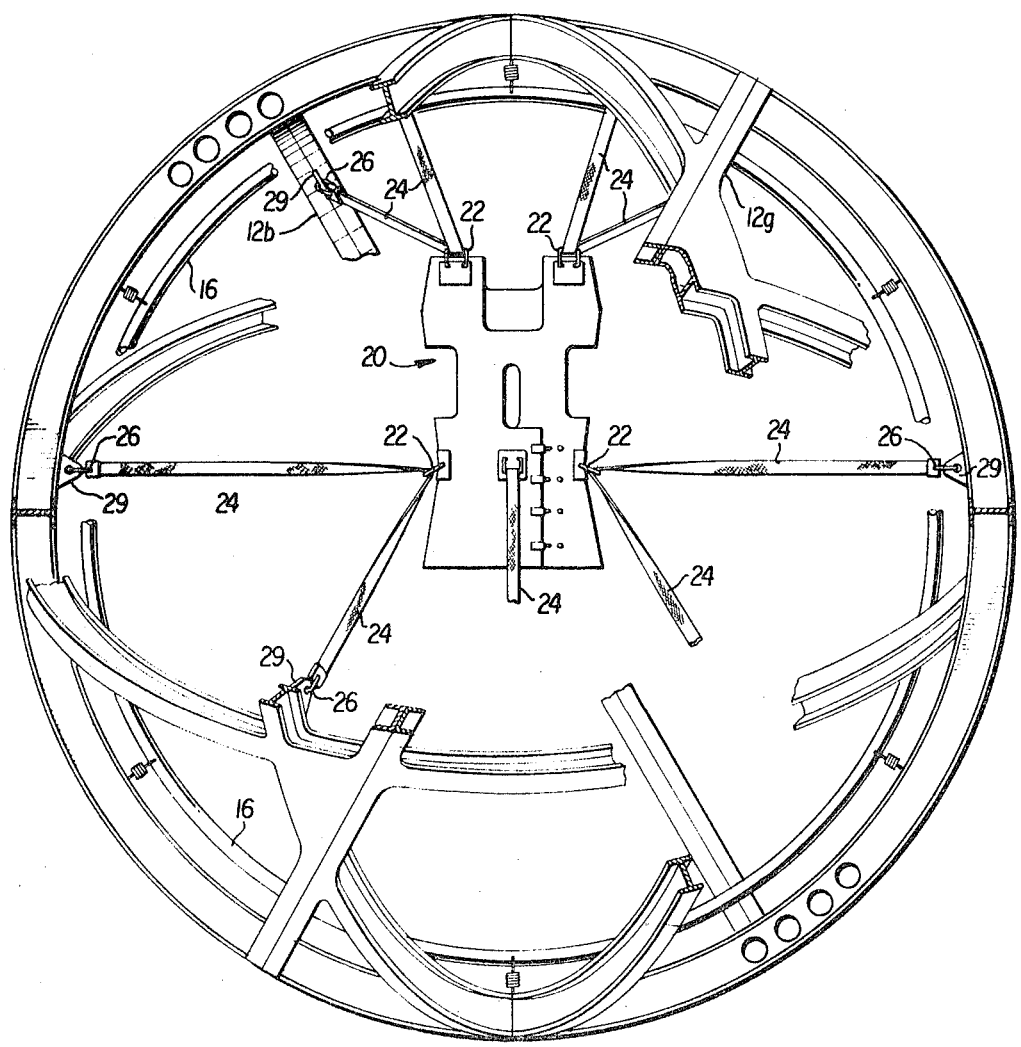
FIG. 3 is a plan view of the spherical vehicle with an outer portion broken away to show how a support vest may be suspended therein.
Figure 4A:
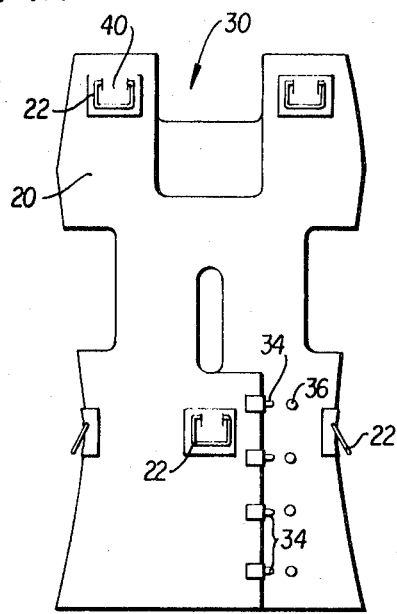
FIGS. 4A and 4B are respectively back and side views of the support vest shown in FIG. 3.
Figure 4B:
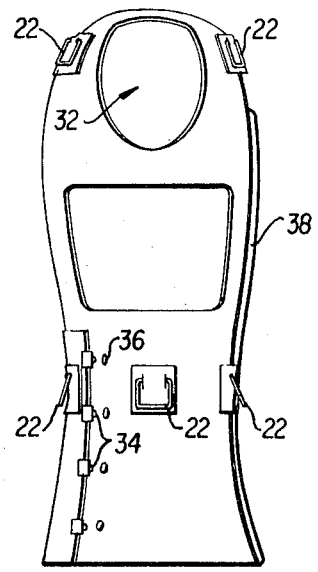

With regard to FIG. 3, there is shown means including a vest 20 for providing substantially complete support to the operator's waist, chest and back, while the operator is disposed in a variety of positions while riding the spherical vehicle 10. As is obvious from FIG. 3, thevest 20 suspends the operator within the spherical vehicle 10 and allows him to manipulate the spherical vehicle 10 even when the operator is in an upsidedown position. More specifically, the vest 20, and therefore the operator secured therein, is suspended by a plurality of straps 24, disposed at various angles from the vest 20 as shown in FIG. 3, 4A, and 4B. One end of the adjustable straps 24 is disposed through a ring 22 securely attached to the vest 20 by a connecting flap 40. In one illustrative embodiment of this invention, the vest 20 is made of a flexible, high-strength plastic and the metal rings 22 maybe secured thereto by the flap 40 which may be integrally molded with the vest 20. The rings 22 are loosely secured by the connecting flaps 40 to permit the rings 22 to rotate as the operator gyrates within the spherical vehicle 10. The other end of the straps 24 are secured to a ring 26 which may be made of a suitable metal. In turn, the rings 26 are received within openings of a support rib 29 secured to a strut member 12.

With reference to FIGS. 4A and 4B, the construction of the support vest 20 is more fully shown. The vest 20 includes a pair of arm openings 32 and a head opening 30 to permit the operator to position himself upward into his vest so that his arms extend through the openings 32 and his head extends through opening 30. With reverse movement, the operator may easily slip out of the vest 20. Once the operator has slipped into the vest 20, he may readily secure himself therein by thightening the waist portion of the support vest 20. More specifically, the operator simply secures a set of hooks 34, which may be molded to the vest 20, to a corresponding set of grommets 36. Once the hooks 34 have been so secured, the operator is safely suspended within the spherical vehicle 10 and may propel, as will be explained later in detail, the spherical vehicle 10 without danger to himself, even if the spherical vehicle will rotate into a position where the operator is suspended in an upside down position. A reinforcement member 38 may be molded with the vest 20 to insure that the back of the operator is rigidly supported. Even if the hands and feet of the operator slip from the handrail, the support vest 20 will suspend the operator riding within the spherical vehicle 10.

In operation, an operator may conveniently enter the sphere as by disassembling two adjacent sphere segments 11 and then after entry, reconnect the parted sphere segments 11. Next, the operator would insert himself into the vest 20 with his arms extending from the openings 32 and his head from opening 30. Next, the lower, or waist portion of the vest 20 will be pulled tightly about the waist of the operator and the hooks 34 connected to the respective grommets 36. To insure maximum safety, the operator inserts his foot into the step assembly 50. Now, the operator is ready to propel the spherical vehicle in several modes. First, the operator may shift the center of gravity of spherical vehicle 10 by disposing his body from the center point of the vehicle 10 causing the vehicle to rotate in the direction of the weight shift. By similar repeated motions, the vehicle 10 will be caused to rotate continuously in a defined direction. As noted above, the vest 20, the handrail 16, and the step assembly 50 provide means by which the operator is held securely in a safe position within the spherical vehicle 10. Further, the operator may make the spherical vehicle 10 "jump" by moving rapidly upward in a jumping motion. By repeated jumping motions to either the fore or aft of the spherical vehicle 10, the operator may move the vehicle 10 in successive jumps in either a forward or backward direction. It may be understood that the plurality of springs 18 permit the operator to move rapidly within the spherical vehicle and to transmit momentum in the desired direction to the spherical vehicle 10. In addition, the springs 18 absorb bumps that may be imparted to the spherical vehicle 10.

Thus, there has been shown a spherical vehicle capable of safely supporting the operator therein and providing a means whereby the operator may propel the spherical vehicle in a circular as well as a jumping motion by manipulating his body within this spherical vehicle.

Numerous changes may be made within the above described apparatus and different embodiments of the invention may be made without departing from the spirit thereof; therefore, it is intended that all matter contained in the foregoing description and shown in the accompanying drawings, shall be interpreted as illustrative and not in a limiting sense.

I claim as my invention:

1. Vehicle apparatus for receiving an operator therein and adapted to be propelled by the movement of the operator therein, said vehicle apparatus comprising:

a. means for defining a hollow body of substantially spherical configuration for receiving the operator therein;
b. support means for suspending the operator within the spherical body while facilitating operator movement to propel said vehicle apparatus;
c. a handrail disposed within said spherical body and spaced apart therefrom, said handrail being adapted to be grasped by the operator; and
d. spring means for fixedly biasing said handrail with respect to said spherical body, said spring means permitting movement of said handrail with respect to said spherical body and transmitting mometum to said spherical body.

2. The vehicle apparatus as claimed in claim 1, wherein said defining means comprises a plurality of strut members secured together at angles with respect to each other for providing said spherical body.

3. The vehicle apparatus as claimed in claim 1, wherein said support means include a vest adapted to be worn by the operator and including releasable fastening means for securing said vest about the operator.

4. The vehicle apparatus as claimed in claim 3, wherein said support means includes a plurality of straps having one end secured to said vest and the other end secured to the inner periphery of said spherical body.

5. The vehicle apparatus as claimed in claim 1, wherein said handrail comprises a continuous member, and said spring means comprises a plurality of springs interconnected between said spherical body and said continuous member.

6. The vehicle apparatus as claimed in claim 1 wherein said spring means includes a plurality of springs interconnected between said handrail and the inner periphery of said spherical body.

7. The vehicle apparatus as claimed in claim 1, wherein said support means includes a shoe assembly configured to receive the foot of the operator and fixedly attached to said handrail.

8. The vehicle apparatus as claimed in claim 1 wherein said defining means comprises a plurality of spherical segments which may be connected together to form said spherical vehicle, whereby said spherical vehicle may be readily assembled and disassembled.

9. The vehicle apparatus as claimed in claim 8 wherein each of said spherical segments has an outer edge, each of said spherical segments being joined together with another of said spherical segments by contact of said outer edges to form said spherical body.

10. The vehicle apparatus as claimed in claim 9 wherein said spherical segments are joined together by a plurality of male projections and female recesses disposed on said spherical segments.

* * * * *